United States Patent [19]

Spear et al.

[11] 4,038,872
[45] Aug. 2, 1977

[54] TEMPERATURE MEASUREMENT SYSTEM FOR CABLES

[75] Inventors: Robert Allen Spear, Oakland; Kenneth Roger Strandberg, Mahwah, both of N.J.

[73] Assignee: The Okonite Company, Ramsey, N.J.

[21] Appl. No.: 648,013

[22] Filed: Jan. 12, 1976

[51] Int. Cl.² .............................................. G01K 7/16
[52] U.S. Cl. .................................................. 73/362 AR
[58] Field of Search ......... 73/362 R, 362 AR, 362 SC; 324/65 R

[56] References Cited

U.S. PATENT DOCUMENTS

| 3,296,866 | 1/1967 | Abe et al. | 73/362 AR |
| 3,818,761 | 6/1974 | Brixy | 73/362 AR |
| 3,890,841 | 6/1975 | Brixy | 73/362 AR |

Primary Examiner—Donald O. Woodiel
Attorney, Agent, or Firm—Hopgood, Calimafde, Kalil, Blaustein & Lieberman

[57] ABSTRACT

A cable temperature measurement circuit includes a heating circuit which comprises a series connection of a current generator, the cable to be heated and a high current shunt and a testing circuit which includes a low current generator, the cable and a low current shunt. Additional circuit means are provided which generate a signal in response to the relative voltage drops across the cable and across either of the high current or low current shunts. An indicator responses to the signal thus generated to provide a readout showing cable temperature.

7 Claims, 3 Drawing Figures

TEMPERATURE MEASUREMENT SYSTEM FOR CABLES

BACKGROUND OF THE INVENTION

In the manufacture of oil impregnated paper wrapped cables having copper or aluminum conductors, the cable conductor is first wrapped with a paper insulation. This paper insulation must then be thoroughly dried prior to oil impregnation. Drying is accomplished by passing a heating current through the cable conductor to heat and thereby dry the paper insulation along its inner surface and by subjecting the outer surface of the paper insulation to a dry heated atmosphere provided by steam jackets in a sealed tank.

During drying the cable temperature must be monitored regularly to insure that it does not exceed predetermined limits and damage the paper insulation. Prior art temperature measurement systems utilized for this purpose could only be used when no heating current was flowing in the conductor. This required that the heating current be interrupted periodically in order to monitor conductor temperature resulting in longer drying periods and more costly cable manufacture.

The present invention solves the above described problem by providing a temperature measuring system which can monitor cable temperature whether or not a heating current is flowing in the cable conductor.

SUMMARY OF THE INVENTION

A cable temperature measurement circuit includes a heating circuit comprising a series connection of a first current generating means, the cable and a first resistance means; and a testing circuit comprising a series connection of a second current generating means, said cable and second resistance means. Circuit means are provided which are responsive to the voltage drop across the cable and the voltage drop across either of the first or the second resistance means to generate a signal at the output terminal of the circuit means. Indicator means are connected to the output terminal of the circuit means and are responsive to this output signal and to a reference signal to indicate the temperature of the cable. If desired an alarm may be provided to give an auditory or visual warning when a predetermined cable temperature is reached.

DESCRIPTION OF THE INVENTION

Figure 1:
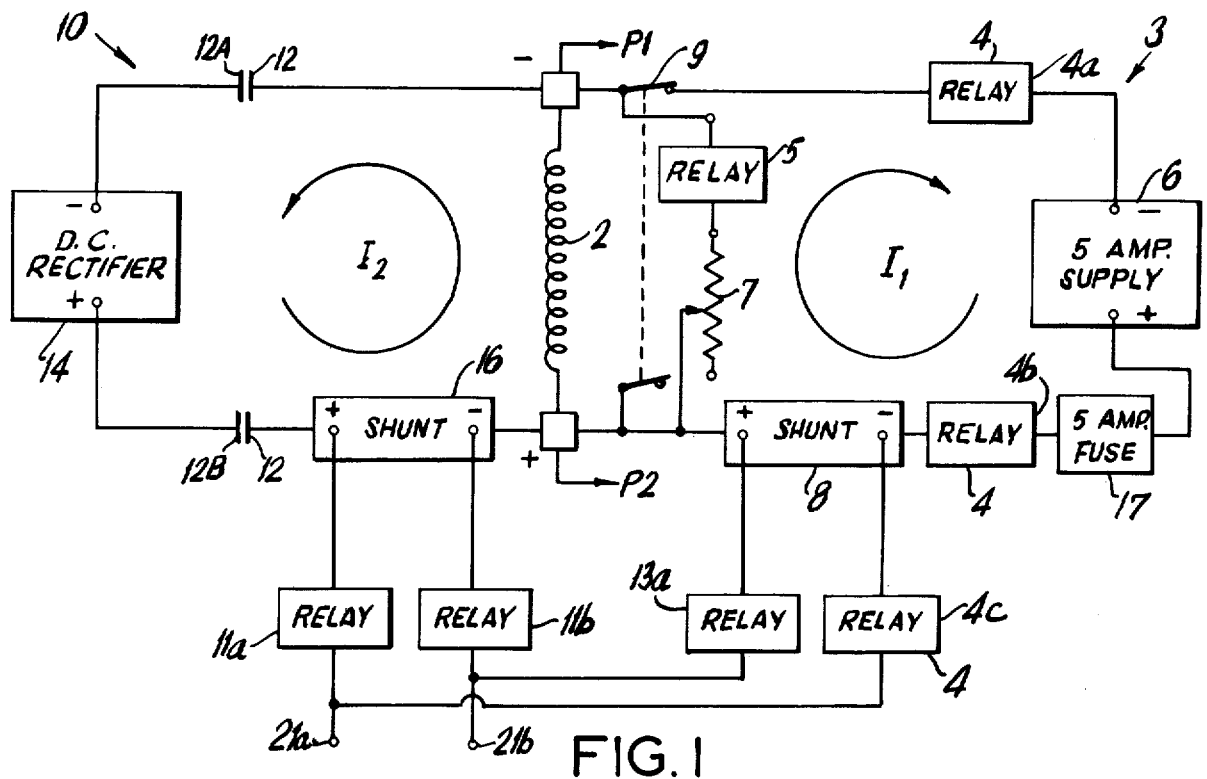
FIG. 1 is a schematic diagram of the heating and testing circuits of the temperature measurement circuit.

In FIG. 1 the load resistance of a cable being processed is represented by a resistor 2. Connected across the cable load resistance 2 between terminals P1 to P2 is a first series circuit 3 which includes a relay 4 having contacts 4a and 4b, a low current supply 6, a low current shunt 8, and if desired a fuse 17. The low current supply may for example be any device for generating a 5 amp D.C. current of which many are known in the art and the low voltage shunt 8 may be any shunt rated at 50 millivolts for 5 amp applied current. A second series circuit 10 is connected between terminals P1 and P2 in parallel with the first circuit 3. The second series circuit 10 includes a pringle switch 12, a high current supply 14, and a high current shunt 16. The high current generator 14 may comprise D.C. rectifiers; the pringle switch 12 is a high current switch having contacts 12a and 12b, and the high current shunt 16 may be a shunt rated at 100 millivolts for 2,000 amp applied current. A circuit comprising the series connection of the relay 5 and potentiometer 7 is connected across the terminals P1 and P2. The potentiometer 7 may be of the slide wire type and have a resistance of 200 ohms.

High current shunt 16 is connected through the contacts 11a and 11b of a relay 11 to the input terminals 21a and 21b of a first circuit branch Y. Low current shunt 8 is connected to terminals 21a and 21b of circuit Y through contacts 4c of relay 4 and contacts 13a of relay 13. By means of relays 4, 11 and 13 the input of circuit branch Y may be taken across either shunt 8 or shunt 16. The manner of switching this input will be described more fully below.

Figure 2:
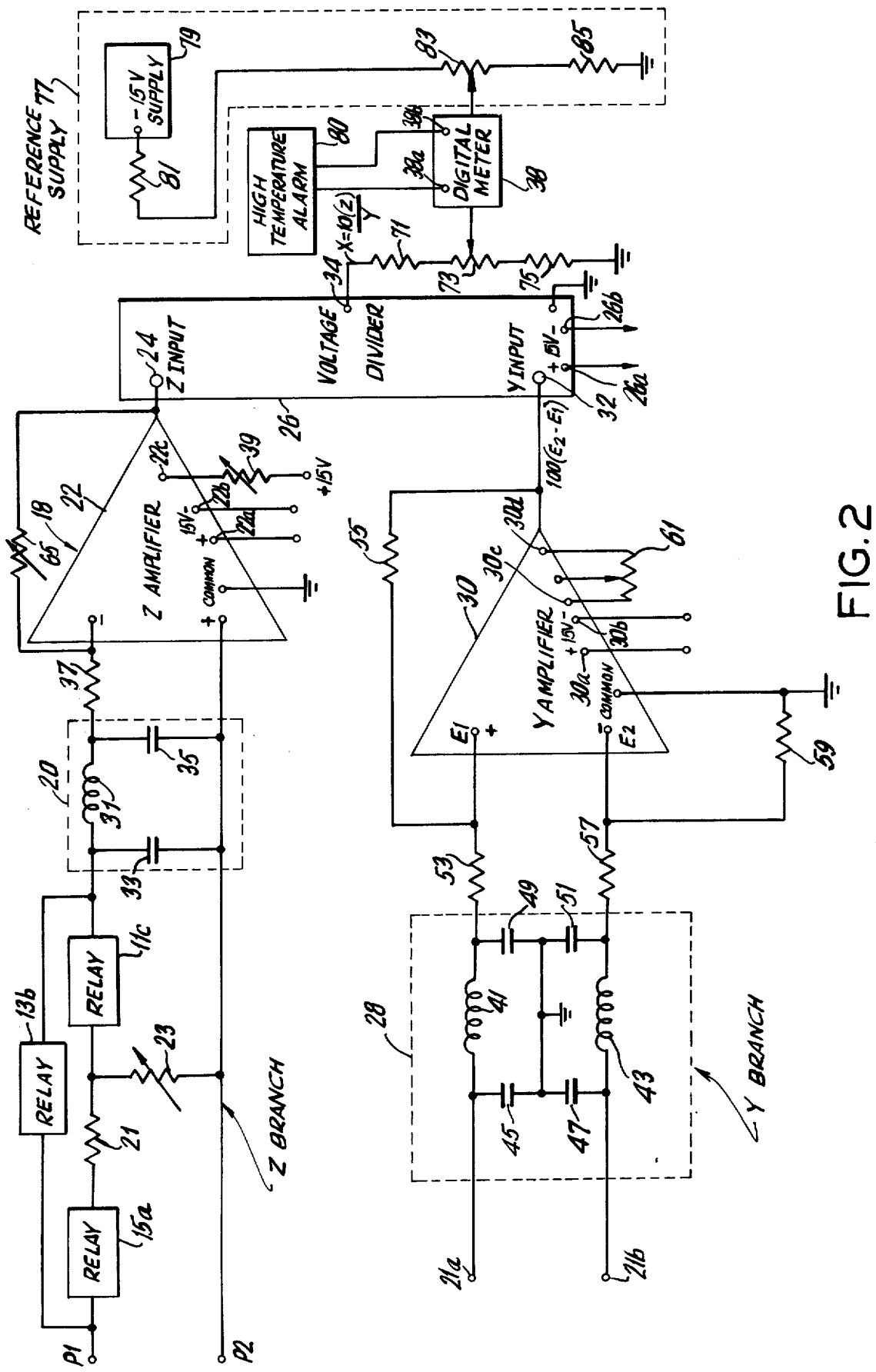
FIG. 2 is a schematic diagram of the remainder of the temperature measurement circuit.

FIG. 2 illustrates a circuit 18 which generates an output signal which is representative of cable temperature by comparing the voltage drops across either low current shunt 8 or high current shunt 16 with the voltage drop across the cable load 2 appearing across terminals P1 and P2. In a first branch Z of this circuit the voltage developed across cable load 2 between terminals P1 and P2 is applied to the input of a noise filter 20 through a parallel circuit comprising a series connection of the contacts 15a of relay 15, resistor 21 and the contacts 11c of relay 11 in parallel with the contacts 13b of relay 13. Variable resistance 23 connected across the incoming circuit from the junction point of resistor 21 and the contacts 11c of relay 11. The filter 20 may include a coil 31 and capacitors 33 and 35 connected to the terminals of coil 31 and across the incoming signal. The filtered output of filter 20 is then applied to the input of an amplifier 22 through a voltage divider comprising resistor 37, which is connected between the filter 20 and one input of amplifier 22, and resistor 65, which is connected across amplifier 22. The amplified output of amplifier 22, a signal Z, is applied to terminal 24, one of two input terminals of a voltage divider network 26. It has been found that this circuit branch Z performs well when the resistors 21 and 23 have resistances of respectively 2K ohms and 50 ohms, the coil 31 has a value of 1.5 Henry and 95 ohms resistance for 10 milliamp current, the capacitor 33 and 35 each are 150mfd/350 volts, the resistor 37 is 2.55ohms and the resistor 65 is a variable resistance with a maximum value of 120K ohms. The amplifier 22 may be an operational amplifier such as Philbrick/Nexus Model SQ 10A with a power supply voltage of 15 volts D.C. applied across its input terminals 22a and 22b and a bias voltage of 15 D.C. volts is applied to its input terminals 22c through variable resistance 39 which may have a value of 50K ohms.

In the second branch Y of the circuit 18 the voltage drop appearing across terminals 21a and 21b is applied to the input of a noise filter 28. The filter 28 may comprise a bridge circuit including coils 41 and 43 and capacitors 45, 47, 49 and 51. The output of filter 28 is applied to an amplifier 30 through a first voltage divider comprising resistors 53 and 55 and a second voltage divider comprising resistors 57 and 59. Resistor 55 is connected across the amplifier 30. It has been found that this Y branch of circuit 18 performs well when coils 41 and 43 of filter 28 are each 1.5 Henery and 95 ohms at a current of 10 milliamps, the capacitors 45 and 47 are each 300mfd/350 volt, capacitors 49 and 51 are each 100mfd/350 volts, the resistance of resistor 53 is 1K ohms while that of resistor 55 is 100K ohms in the first voltage divider and the resistance of resistor 57 is 1K ohms while that of resistor 59 is 100K ohms in the second voltage divider. The amplifier 30 may be an operational amplifier such as a Philbrick/Nexus Model 1003, which is chosen to generate an output equal to 100 $(E_2 - E_1)$ where $E_2$ and $E_1$ are the voltages appearing at terminals $E_1$ and $E_2$. A power supply voltage of 15 volts D.C. is applied to terminals 30a and 30b of the amplifier 30 and a potentionmeter 61 preferbly having a resistance of 5K ohms is attached across two other terminals 30c and 30d of the amplifier 30.

The outputs of amplifiers 22 and 30 are applied respectively to the Z input terminal 24 and the Y input terminal 32 of a divider network 26. The divider network 26 is chosen such that it generates an output X on its output terminal 34 which conforms to the equation $$X = 10Z/Y$$

where Z is the input appearing on terminal 24 and Y is the input appearing on terminal 32. A power supply voltage of 15 volts D.C. is applied across the bias terminals 26a and 26b of the voltage divider 26. Hybrid Systems Analog Divider Network Model 106A may be used as the divider network 26.

The output X of divider network 26 which appears at terminal 34 is applied to a resistance network comprising the series connection of resistor 71, potentiometer 73 and resistor 75 which is connected to a source of reference voltage. The resistor 71 may have a value of 9.1K ohms, the potentiometer 73 may have a value of 1K ohms and resistor 75 may be 1K ohms.

A digital meter 38, such as Datascan Model 420-V2, may be connected to potentiometer 73 and to a source of reference potential 77 to provide a digital temperature readout. If desired the output terminals 38a and 38b of digital meter 38 may be connected to a high temperature alarm 80. The alarm 80 may be any device adopted to provide an auditory or visual output when the output of the digital meter 38 reaches a predetermined maximum value. The source of reference potential 77 may include a −15 volt D.C. power supply 79 and a voltage divider network including a resistor 81, a potentiometer 83 and a resistor 85 which is connected to a source of common voltage and amy have resistances of 33K ohms for resistor 81, 1K ohms for potentiometer 83 and 680 ohms for resistor 85.

Figure 3:
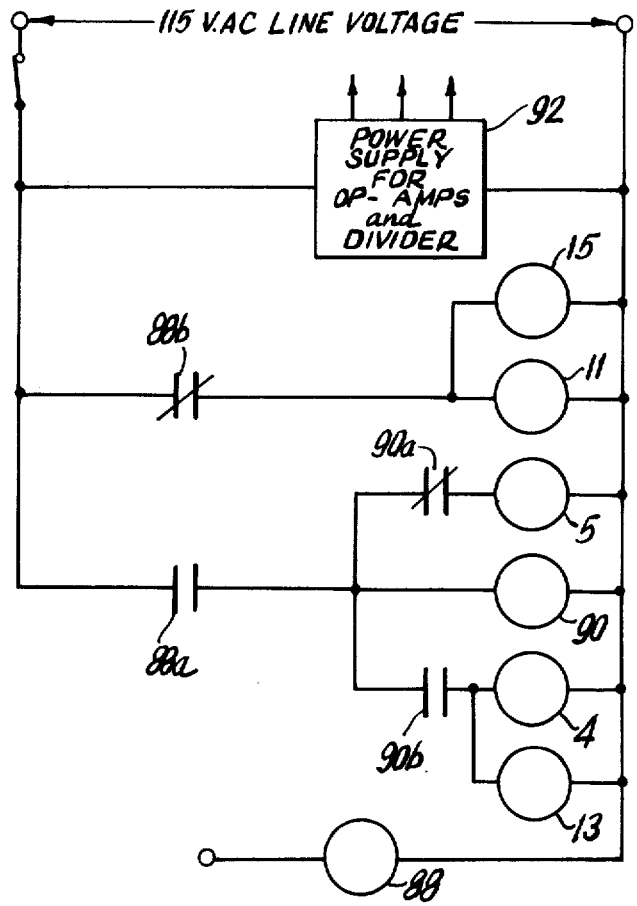
FIG. 3 is a relay diagram for the circuits of FIGS. 1 and 2.

The operation of the inventive cable measuring circuit will now be described with reference to the relay diagram of FIG. 3 in which the relays 4 and 11 may be Potter Brumfield Model 14AN-120, relays 5, 13, 15 and 88 may be Potter Brumfield Model 11AN-120 and relay 90 may be a time delay relay such as Guardian Model TDO-62C30-115A. Heating current $I_2$ is generated in heating circuit 10 by the high current supply 14 and caused to flow through the high current shunt 16, the cable load 2 and the pringle switch contacts 12a and 12b resulting in a voltage drop across cable load 2 between terminals P1 and P2, and a voltage drop across shunt 16 when the pringle switch 12 is in its closed position. The cable load 2 provides a D.C. resistance which varies with the cable being processed and increases in value as the cable is heated during the drying process. The series circuit 10 which provides heating current $I_2$ is utilized during the actual cable drying process as a part of the circuit to measure cable temperature as described below.

During periods when the pringle switch 12 is closed, relay contacts 4a and 4b are open and relay 5 is deenergized. The heating current $I_2$ is then flowing in circuit 10, the voltage drop across the high current shunt 16 is applied to the noise filter 28 of the branch Y of circuit 18 and after passing through filter 28 and the voltage dividers comprising the pairs of resistors 53 and 55, and 57 and 59 is applied to the input terminals $E_1$ and $E_2$ of the amplifier 30. The output of amplifier 30 corresponding to $100(E_2 - E_1)$ is then applied as signal Y to input terminal 32 of the divider network 26.

The voltage drop across cable load 2 is simultaneously applied to the input terminals of the Z branch of circuit 18, through the closed relay contacts 15a and 11c and the voltage divider of resistors 21 and 23. Then through noise filter 20 and the amplifier 22, the output of amplifier 22 is applied to input terminal 24 of divider network 26 as signal Z. In response to input signals Y and Z the divider network 26 generates an output signal X which is a function of these input signals as described above. This output signal is in turn applied through potentiometer 73 in the series connected resistances 71, 73 and 75 to one input of the digital meter 38.

As indicated above the digital meter 38 then responds to input signal X and a reference input signal to provide a temperature readout which may for instance be in degrees Farenheit during all periods in which either the heating current $I_2$ or the testing current $I_1$ is flowing. The reference signal is supplied to a second input terminal of digital meter 38 by reference voltage supply 77. Reference supply 77 includes a −15 volt D.C. supply 79 and a resistance network including resistors 81 and 85 and potentiometer 83. Its output is taken from potentiometer 83. A high temperature alarm device may be connected to the output terminals 42 of digital meter 38 and may be adjusted to generate a visual or auditory alarm signal whenever the cable temperature reaches or exceeds a predetermined upper limit value.

The heating current $I_2$ is disconnected by opening the pringle switch 12 when the pringle switch 12 is opened contacts 12a and 12b open breaking heating circuit 10 and placing the shunt circuit including the contacts of relay 5 and potentiometer 7 in parallel with the cable load 2 and energizing relay 88. As seen in FIG. 3 relay 88 has normally open contacts 88a which are connected across the A.C. supply. Contacts 88a of relay 88 are connected in series with relays 5, 4, 13 and a delayed relay 90. The relay 88 also has normally closed contacts 88b which are connected across the A.C. supply and in series with relays 11 and 15. When relay 88 is energized it in turn energizes relay 90 and relay 5. Energizing relay 5 permits conduction in the shunt circuit including relay 5 and potentiometer 7. The relay 90 is a delayed relay, chosen to have a delay period of 10 seconds at the end of which contact 90a is held in an open position deenergizing relay 5 and opening the shunt circuit and contact 90b closes energizing relays 4 and 13.

When relay 4 is energized contacts 4a and 4b close completing circuit 3. Low voltage D.C. supply 6, which is preferably rated at 5 amperes, then causes a low voltage testing current $I_1$ to flow in circuit 3 and generates a voltage drop across low voltage shunt 8. Since contacts 4c and 13a of energized relays 4 and 13 are then closed the voltage drop across shunt 8 appears at the input terminals 21a and 21b of the Y circuit. Since current $I_2$ is not flowing, there is no voltage drop over shunt 16 during this period and in ay case contacts 88b are open during this period so that relays 15 and 11 are deenergized and contacts 11a and 11b are open interrupting the connection between the Y circuit and high current shunt 16. During this period since relays 15 and 11 are deenergized and relay 13 is energized, the voltage divider at the head of the Z circuit branch comprising resistor 21 and potentiometer 23 is bypassed. This voltage divider is unnecessary with the relatively low voltage drop across the cable load 2 resulting from testing current $I_1$ and is only utilized for the higher voltage drop across the shunt 16 resulting from the high current $I_2$. Circuit branches Y and Z operate as described above and voltage divider 26 again generates a signal at terminal 34 to activate digitalmeter 38.

When the heating current $I_2$ is to be restarted the pringle switch 12 is closed closing contacts 12a and 12b to complete circuit 10 and deenergizing relay 88. This causes contact 88a to open and deenergizes relays 4 and 13 and causes opened contacts 88b of relay 88 to close energizing relays 11 and 15. The contacts 4a, 4b, 4c and 13a are thus opened cutting circuit 3 and disconnecting shunt 8 from the Y circuit while contacts 11a and 11b are closed connecting shunt 16 to the Y circuit. In the Z circuit bypass relay contacts 13b open and contacts 15a and 11c close to connect the voltage divider including resistor 21 and potentiometer 23 across the input filter 20 to protect against the high voltage drop across cable load 2 resulting from this passage of high heating current $I_2$ through the cable load 2.

As described above the circuit of FIGS. 1, 2 and 3 provides constant cable temperature monitoring through digital meter 38 and high temperature alarm 80 during periods when the heating current $I_2$ is flowing as well as during periods when it is disconnected and testing current $I_1$ flows. This provides a constant check on cable temperature and prevents costly wastage caused by overheating.

We claim:
1. A cable temperature measurement circuit including
   a heating circuit comprising a series connection of a first current generating means, first switch means, said cable and first resistance means;
   a testing circuit comprising a series connection of a second current generating means, second switch means, said cable and second resistance means;
   a first relay connected to said first and second switch means such that said first relay is deactivated by the closing of said first switch means to open said second switch means and deactivate said testing circuit, and is activated in response to the opening of said first switch means to close said second switch means and activate said testing circuit;
   third switch means having a first pair of input terminals connected across said first resistance means, a second pair of input terminals connected across said second resistance means and output terminals, said third switch means being connected to said first relay and being responsive to the activation of said first relay to connect said second pair of input terminals to said output terminals and being responsive to the deactivation of said first relay to connect said first pair of input terminals to said output terminals;
   a voltage divider having a first and second input terminals and an output terminal, said voltage divider being adapted to provide an output signal which is a function of the input signal applied to said first and second input terminals;
   a first amplifier circuit having input terminals connected across said cable and an output terminal connected to said first input terminal of said voltage divider; a second amplifier circuit having input terminals connected to the output terminals of said third switch means and an output terminal connected to said second input terminal of said voltage divider;
   a source of reference voltage; and
   indicator means connected between said voltage divider and said source of reference voltage, said indicator means being adapted to provide a readout representative of the temperature of said cable.

2. A cable temperature measurement circuit as claimed in claim 1 in which said indicator means includes means for generating an alarm signal.

3. A cable temperature measurement circuit as claimed in claim 1 in which said third switch means includes a second relay connected to said first relay, said second relay having contacts connected between said first pair of input terminals and said output terminals of said third switch means, and said second relay being activated by the deactivation of said first relay to close said contacts and connect said first pair of input terminals to said output terminals of said third switch means; said third switch means further including at least a third relay connected to said first relay and having contacts connected between said second pair of input terminals and said output terminals of said third switch means, said third relay being activated by the activation of said first relay to close the contacts of said third relay and connect said second pair of input terminals to said output terminal.

4. A cable temperature measurement circuit as claimed in claim 1 in which said first amplifier circuit includes a series connection of a second voltage divider, a noise filter and an amplifier connected between said input terminals and said output terminal of said first amplifier circuit, and fourth switching means connected across said second voltage divider, said fourth switching means being connected to said first relay and being responsive to the activation of said first relay to bypass said second voltage divider.

5. A cable temperature measurement circuit as claimed in claim 4 including bias means to adjust said first amplifier for ambient temperature.

6. A cable temperature measurement circuit as claimed in claim 1 in which said second amplifier circuit includes a series connection of a second filter circuit and a second amplifier circuit conncted between said input terminals and said output terminal of said second amplifier circuit.

7. A cable temperature measurement circuit as claimed in claim 1 including a bypass resistance connected across said cable and fifth switch means connected in series with said bypass resistance, said fifth switch means including a delay relay which is connected to said first relay and which is activated for a predetermined period in response to the activation of said first relay.

* * * * *